July 6, 1926.
A. McCREREY
1,591,172
STEERING MECHANISM FOR PLOWS
Filed Oct. 9, 1925
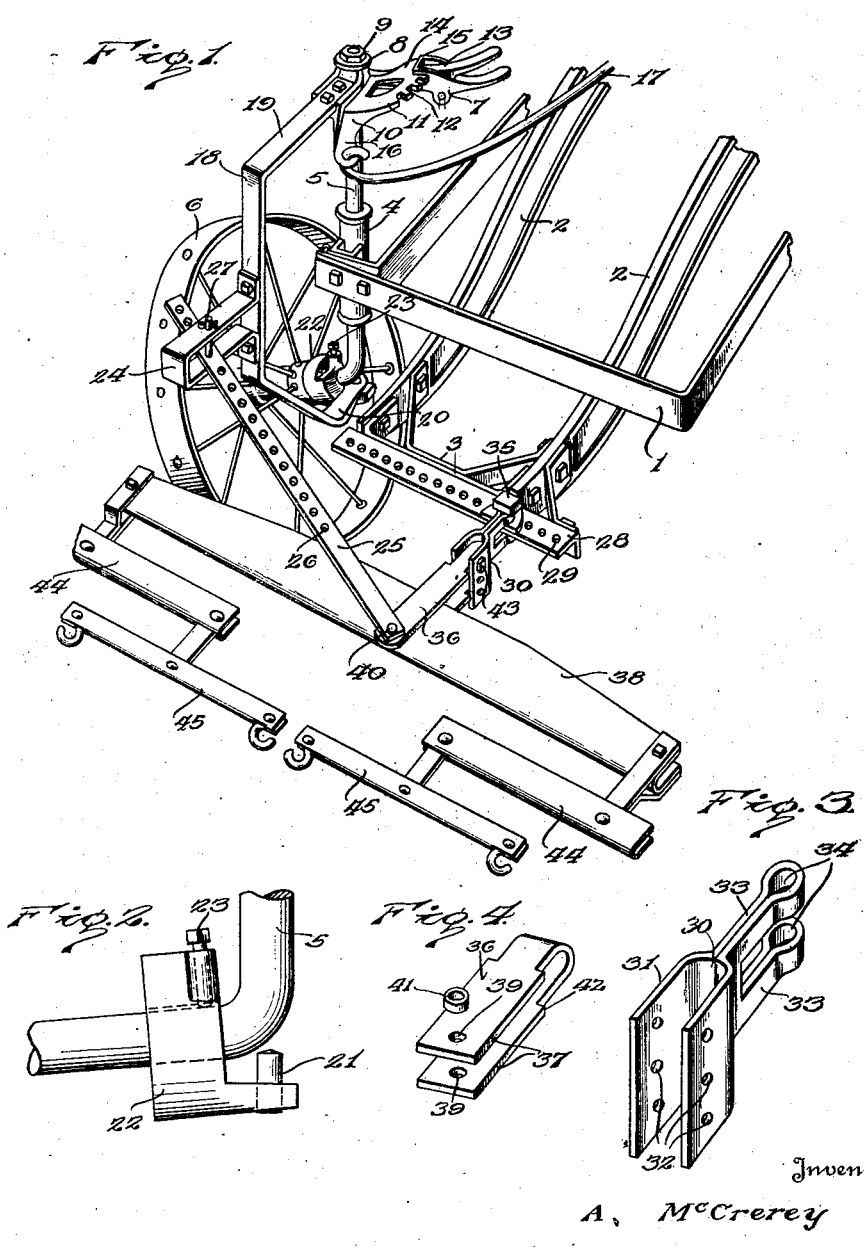
Inventor
A. McCrerey
By *Larry Lowry*, Attorneys Patented July 6, 1926.

1,591,172

UNITED STATES PATENT OFFICE.

ALEXANDER McCRERBY, OF HIAWATHA, KANSAS.

STEERING MECHANISM FOR PLOWS.

Application filed October 9, 1925. Serial No. 61,536.

This invention relates to means for steering wheeled plows and has for its primary object the provision of a mechanism which will effectually impart the desired direction of travel to the plow so that furrows will be formed in proper relation to previously formed furrows and the usual draft poles or tongues and neck yokes will be eliminated. The invention seeks to provide a mechanism for the stated purpose which may be readily adjusted to apply the draft along any desired longitudinal line of the machine and will cause the plows to follow behind the draft team when making turns so that a wide or a sharp turn may be made as desired. Other incidental objects of the invention will appear as the description of the same proceeds, and the invention resides in certain novel features which will be particularly pointed out in the appended claims.

In the drawing:

Figure 1 is a perspective view of the furrow wheel of a plow with the draft mechanism connected therewith;

Fig. 2 is an enlarged detail elevation of the lower support for the main bracket;

Fig. 3 is a detail perspective view of the support for the clevis, and

Fig. 4 is a detail perspective view of the clevis.

In the drawing, the reference numeral 1 indicates a portion of the front end of a plow frame and 2 indicates plow beams which are supported upon the frame in any well-known manner (not shown) and have their front ends connected by yokes or brackets 3. At the furrow side of the machine, the frame 1 is equipped with a sleeve or bearing 4 in which the spindle 5 carrying the furrow wheel 6 is rotably mounted. In carrying out my invention, I provide a bracket 7 which has a hub clamped upon the upper end of the spindle 5 by a washer 8 and nut 9, and rotatably fitted about the hub of this bracket is a casting 10 having an arcuate edge 11 provided with notches 12 adapted to be engaged by a latch 13 mounted upon the bracket 7, as shown in Fig. 1. The casting 10 presents a plate 14 passing over the bracket 7 and under a yoke 15 formed thereon, the said yoke constituting a guide for the plate and also a housing for the latch 13. At its front end, the casting 10 is provided with a lug or ear 16 in which is engaged the front end of a coupling rod 17 which extends rearwardly and is attached to one of the rear wheels of the machine. The main bracket 18 consists of a strap or bar disposed vertically in advance of the spindle 5 and having a rearwardly projecting arm 19 at its upper end which is bolted or otherwise rigidly secured to the casting or head 10, and at the lower end of the bracket is a rearwardly extending arm 20 which is provided at its extremity with an opening whereby it may be pivotally engaged over a stud 21 formed upon a collar 22 which encircles the lateral member of the spindle 5 and is secured thereon by a set screw 23 in an obvious manner. This collar 22 prevents the furrow wheel 6 riding inwardly upon the axle member of the spindle 5 and also prevents the access of dirt and other foreign matter to the interior of the hub of the wheel. The lower portion of the main bracket 18 is disposed obliquely between its vertical portion and the arm 20 so that it will provide clearance for the front ends of the plow beams 2, as will be understood. Rigidly secured upon the front side of the main bracket is a yoke 24 which has its side members disposed in vertically spaced relation and projecting at a right angle to the main bracket. Extending through this yoke is a coupling bar 25 provided with a longitudinal series of openings 26 therethrough, and through the top and bottom of the yoke 24 and a selected one of the openings 26 is engaged a pivot pin 27 which is retained within the yoke in any convenient or preferred manner. Rigidly secured to the yokes or brackets 3, or otherwise fixed to the front ends of the plow beams 2, is a draft bar 28 which is preferably of the angle form shown in Fig. 1 and is provided with a series of openings 29 extending through its forward horizontal web, as shown. A coupling bracket 30 is carried by the draft bar 28, and this bracket consists of a front vertically disposed yoke or fork 31 having openings 32 through its sides and vertically spaced arms 33 extending rearwardly from the said yoke or fork to pass above and below the draft bar 28. Eyes 34 are formed at the rear ends of the arms 33 and through the said eyes and a selected opening 29 is engaged a coupling pin 35. The main clevis 36 consists of a plate folded or doubled upon itself to provide parallel branches 37 passing respectively above and below the main whippletree 38 and provided adjacent their front ends with openings 39 through which and the whippletree is passed a coupling pin 40. This coupling pin 40 also passes through an opening provided therefor in the inner end of the coupling bar 25, the head of the pin being disposed over the bar so that the bar cannot be accidentally released from the pin. The pin is held against withdrawal by a nut or other retaining device applied to its lower end below the lower member 37 and around the upper portion of the pin and between its head and the top of the clevis 36 is fitted a bushing or spacing sleeve 41 which passes through the opening in the coupling bar 25 so that the head of the pin cannot be clamped against the coupling bar, the bar being thus given sufficient freedom of movement to accommodate all working angular positions of the clevis without binding upon the coupling pin or other parts. The rear end of the clevis 36 is reduced in width as shown at 42 in Fig. 4, and fits between the side members of the yoke or fork 31, a coupling pin or bolt 43 being inserted through alined openings 32 of the said fork and through the bight of the clevis so that the clevis will be pivotally supported by the fork. Of course, the pin or bolt 35 permits pivotal movement of the coupling or connecting member 30 relative to the draft bar 28 and as the pivots 35 and 43 are disposed at right angles to each other, the clevis and the whiffletree 38 carried thereby may have universal movement relative to the draft bar. Carried by the ends of the whiffletree 38 are doubletrees 44 and singletrees 45 are carried by the ends of the doubletrees.

From the foregoing description, it will be understood that my steering mechanism is designed more particularly for application to wheel plows which are drawn by draft animals, and it will be noted that the draft pole or tongue and the neck yoke which have been heretofore necessary and are burdensome have been eliminated. When the machine is in use in plowing, the draft will keep the traces taut so that the whiffletrees will be supported and will not strike the heels or bodies of the draft animals. When the machine is being drawn idly from one field to another field or from or to a barn or other storage place, any form of drag may be attached to the rear wheels of the plow so that the plow will be held against travel at a speed greater than that of the draft animals and the draft devices will be thereby kept from dropping against the animals. The animals can be hitched or unhitched more easily and in less time than is possible where the draft tongue and neck yokes are employed and the danger of accidents and injuries caused by breaking tongues is entirely eliminated. The draft animals have perfect freedom of action and may turn in either direction without being impeded in any way by any elements employed in my device, and by setting the pins 27 and 35 in the proper openings 26 and 29 respectively the draft elements may be so adjusted as to permit the plow to be drawn closer to a fence than was practical with devices heretofore employed.

When draft is applied, the position of the coupling pin 40 controls the position of the bracket 18 which in turn controls the position of the furrow wheel. To set the furrow wheel in the desired position, the latch 13 is released from the plate 14 and the said latch and the bracket 7 then shifted relative to the plate 14 so that the latch may engage a different notch 12 therein. Inasmuch as the bracket 7 is securely fastened to the spindle 5, this shifting of the bracket relative to the plate 14 and head 10 will set the furrow wheel in a different angular position and hence cause it to move properly in the steering of the machine. The draft is applied to the wheel through the coupling bar 25 and the main bracket 18 with the yoke 24, while it is applied to the plows through the clevis 36, the coupling 30 and the draft bar 28 so that the machine will travel steadily when the general direction of the draft is not changed while at the same time the furrow wheel will automatically effect such shifting of the plows as will cause the newly formed furrows to be parallel with the last furrow and in which the furrow wheel is running. The steering devices do not interfere in any way with the vertical displacement of the spindle 5 and the furrow wheel but readily follow such displacement so that the mechanism is always in its proper operative condition.

Having thus described the invention, I claim:

1. The combination with plow beams, and a furrow wheel adjacent the front ends of the plow beams, of a bracket disposed in advance of the spindle carrying the furrow wheel and supported at its upper and lower ends by said spindle, means for varying the angular relation of the bracket to the spindle, draft devices, means for connecting the draft devices with the front ends of the plow beams, and means for coupling the bracket to said draft devices.

2. The combination with plow beams, of a draft bar rigidly connected with the front ends of the plow beams, a draft-applying member, a clevis having portions disposed respectively above and below said draft-applying member, a coupling connecting said clevis with the draft bar for relative universal movement, a furrow wheel, a vertical spindle carrying the furrow wheel, a bracket connected with said spindle, a coupling bar connected to the bracket and having one end resting on the clevis, a headed coupling pin inserted through the coupling bar, the clevis and the draft-applying member, a spacing sleeve around said coupling pin between the top of the clevis and the head of the pin, said spacing sleeve passing through the coupling bar, and means on the lower end of the coupling pin below the clevis for securing the same.

3. The combination with plow beams, a furrow wheel, and a vertical spindle carrying the furrow wheel, of draft-applying devices, connections between said devices and the front ends of the plow beams, a bracket having its main portion disposed vertically in advance of the spindle and having its ends extended rearwardly to the spindle, a coupling bar connecting at one end with the draft-applying devices and adjustably connected at its opposite end with said bracket, a head secured to the upper rear extremity of the bracket and rotatably fitted on the upper end of the spindle, means for securing said head in a set relation to the spindle, a collar secured upon the wheel-carrying portion of the spindle, an a pivot element on said collar engaged by the lower end of the bracket.

In testimony whereof I affix my signature.

ALEXANDER McCREREY.